Jan. 31, 1939. G. L. COTTER 2,145,567
ELECTROPNEUMATIC BRAKE
Filed June 30, 1937
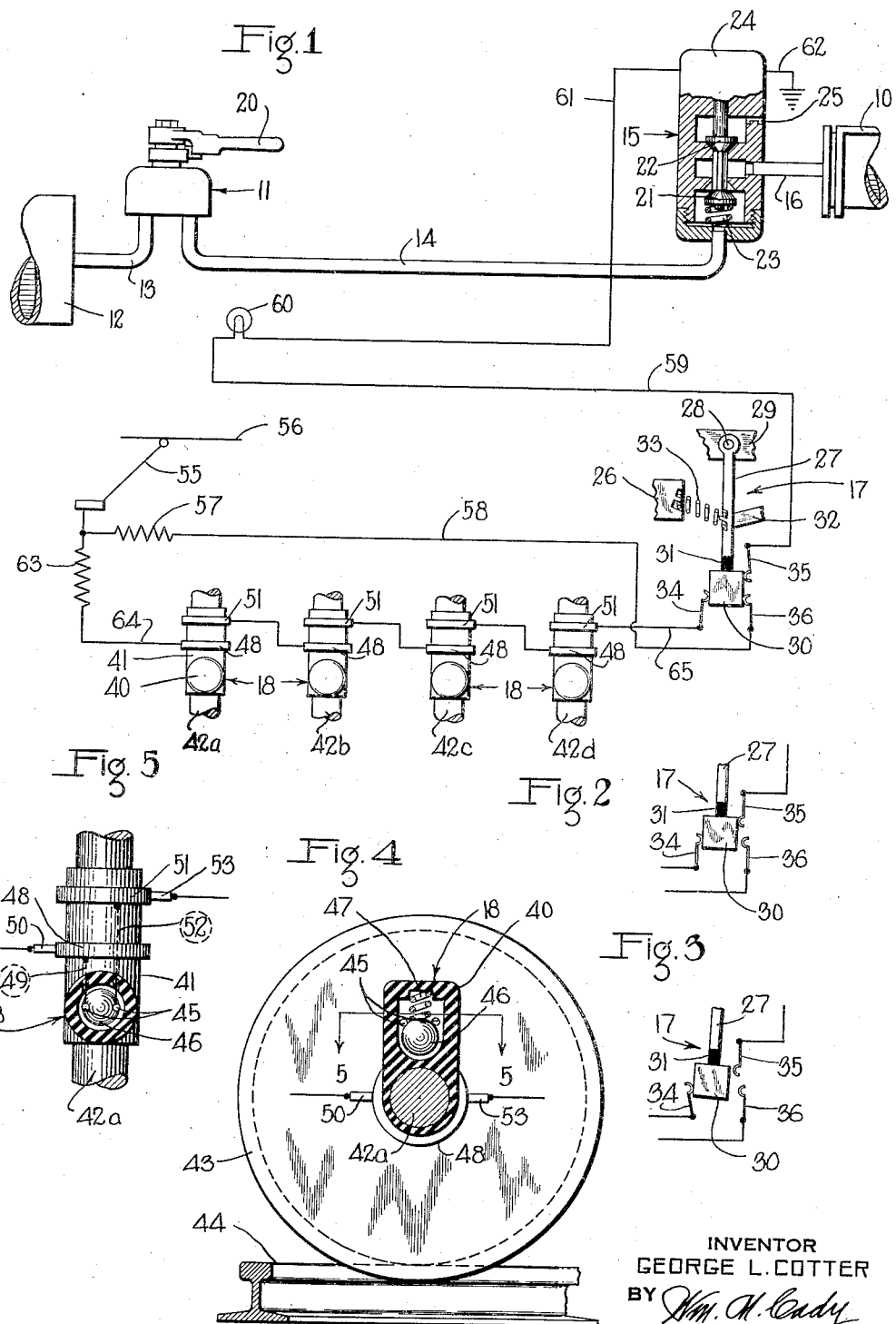
INVENTOR
GEORGE L. COTTER
BY Wm. H. Cady
ATTORNEY Patented Jan. 31, 1939

2,145,567

UNITED STATES PATENT OFFICE 2,145,567

ELECTROPNEUMATIC BRAKE

George L. Cotter, Forest Hills, Pa., assignor to The Westinghouse Air Brake Company, Wilmerding, Pa., a corporation of Pennsylvania Application June 30, 1937, Serial No. 151,228

9 Claims. (Cl. 303—24)

This invention relates to electropneumatic brakes, and more particularly to brakes of the electropneumatic type intended for railway and traction vehicles wherein means are provided for correcting wheel sliding and for controlling the rate of retardation of the vehicle.

It is a matter of elementary knowledge that if the brakes on a railway or traction vehicle are applied to too great a degree the resulting braking force may be greater than that permissible under the existing adhesion conditions between wheels and rails. As a consequence, the wheels will begin to slip, that is, decrease in speed below that corresponding to vehicle speed, and will if the braking force is not immediately reduced attain a locked wheel state. This locked wheel state, during which the wheel does not rotate at all, is referred to as a sliding wheel.

Sliding wheels are objectionable not only because flat spots are worn on the treads of the wheels, thereby rendering them unfit for regular service, but also because the retarding effect produced by a sliding wheel is considerably less than the retarding effect produced by a rolling wheel. It follows, therefore, that wheel sliding is to be guarded against both from the standpoint of avoiding expensive maintenance, and from the standpoint of obtaining the shortest possible stopping distance.

The danger of wheel sliding increases as the rate of retardation of a vehicle increases. This is obvious from the fact that to obtain the higher rates of retardation higher braking forces must be employed. In providing means for correcting wheel sliding, such means need be primarily operative only in the upper range of permissible rates of retardation.

Accordingly therefore, it is a principal object of the present invention to provide a brake system wherein means are provided to be operative only above a chosen rate of retardation to correct a wheel sliding condition.

In carrying out the above set forth object, I contemplate the provision of means associated with each axle of a railway vehicle so arranged that upon the slipping of the wheels associated with any one axle a release valve device will be operated to release fluid under pressure from the brake cylinder operating the brakes, and thereby release the brakes on the slipping wheels. As before stated, I contemplate that such release means will be effective only above a certain chosen rate of retardation. To determine this rate of retardation I prefer to employ an inertia device which operates responsive to the rate of retardation of the vehicle.

Now in order that wheel sliding shall be readily corrected where poor rail conditions are encountered, it is desirable that the brake releasing means be made operative at a relatively low rate of retardation. On the other hand, where good rail conditions are encountered, and the danger of wheel sliding is reduced, a higher rate of retardation may be tolerable. Even under good rail conditions, however, the ultimate rate of retardation should be limited, so that a smooth stop will be insured.

It is, therefore, a further object of the present invention to provide a brake system which not only includes means for correcting a wheel sliding condition, but which also includes means for limiting the ultimate rate of retardation produced by an application of the brakes.

Other and more specific objects of the invention, dealing particularly with the arrangement and construction of certain apparatus, will be more fully understood from the following description of an embodiment of the invention, which is illustrated in the attached drawing, wherein, Fig. 1 shows in schematic and diagrammatic form an adaptation of the invention to a single railway vehicle, indicated diagrammatically as having four axles.

Fig. 2 is a fragmentary view showing the position of the contacts of the retardation controller device in Fig. 1 at what is hereinafter termed a lower limiting rate of retardation.

Fig. 3 is a view similar to Fig. 2, but showing the position of the contacts of the retardation controller device at what is hereinafter termed an upper limiting rate of retardation.

Fig. 4 is a view showing the centrifugal type of electric switch employed associated with each vehicle axle.

Fig. 5 is a fragmentary detail view taken along the line 5—5 of Fig. 4.

In illustrating an embodiment of the invention, a fluid pressure brake system has been shown in its most elementary form, as comprising a brake cylinder 10, a brake valve device 11, and a supply reservoir 12. The reservoir 12 is maintained charged with fluid under pressure by any of the usual means. The brake valve device 11 supplies fluid under pressure to the brake cylinder 10 from the reservoir 12, by way of pipes 13 and 14, magnet valve device 15, and pipe 16.

For controlling the operation of the magnet valve device 15, I have provided a retardation controller device 17 and a plurality of centrifugally operated switch devices 18, each of which is associated with one vehicle axle.

Considering the parts above enumerated now more in detail, the brake valve device 11 may be of any one of the usually employed types. For example, I have shown this valve device as of the rotary type, although it is to be understood that the self-lapping type may be also employed if desired. For the purpose of this disclosure, it may be assumed that the brake valve device is provided with a handle 20 having the usual release, application and lap positions.

Considering now the magnet valve device 15, this device is embodied in a casing having disposed therein a supply valve 21 and a release valve 22, preferably connected and operated together. A spring 23 urges the supply valve 21 toward seated position and the release valve 22 toward unseated position, while an electromagnet 24 operates when energized to actuate the supply valve 21 to unseated position and the release valve 22 to seated position.

The supply and release valves 21 and 22, respectively, are shown in the position assumed when the electromagnet 24 is energized. In this position the supply valve 21 opens communication between the pipes 14 and 16, and the release valve 22 closes communication between the pipe 16 and an exhaust port having a restriction 25 therein. When the electromagnet 24 is deenergized, the spring 23 shifts the supply and release valves to their seated and unseated positions, respectively. Communication between pipes 14 and 16 is then closed, and pipe 16 is opened to the atmosphere past the then unseated release valve 22, and by way of the exhaust port containing the restriction 25.

Considering now the retardation controller device 17, this device comprises a pendulum 27 pivotally mounted on anti-friction bearings at 28 to some stationary part of the vehicle, or a casing member 29 secured to the vehicle. The pendulum 27 is provided with a weight or mass 30 at its lower end, which weight or mass is preferably insulated by insulating member 31 from the pendulum proper.

In the position illustrated in Fig. 1, the pendulum 27 is biased against a stop 32 by a spring 33 reacting between the pendulum 27 and a stationary part 26. In this position of the pendulum the weight 30 engages three stationary contacts 34 and 35 and 36. These stationary contacts are preferably of the resilient type, so as to readily yield to movement of the pendulum 27 without appreciably opposing such movement.

The retardation controller device is preferably positioned on the vehicle such that when the vehicle is decelerating the pendulum 27 swings to the left. The spring 33 is a calibrated spring so that the degree of movement of the pendulum to the left is a measure of the rate of deceleration of the vehicle. When the vehicle is decelerating at or above what will be termed a lower limiting rate of retardation, the pendulum 27 may assume the position shown in Fig. 2, where it will be observed that the weight 30 is disengaged from the stationary contact 36, while retaining engagement with the two stationary contacts 34 and 35.

When the pendulum 27 has been swung to the left as a result of what will be termed an upper limiting rate of retardation of the vehicle, it may assume the position shown in Fig. 3, where it will be observed that the weight 30 has disengaged from both of the stationary contacts 35 and 36. The purpose of this operation of the retardation controller contacts will be more fully understood subsequently.

Considering now the centrifugally operated switch devices 18 as before explained the equipment has been illustrated in connection with a vehicle having four axles. These axles are shown in fragmentary form at 42a, 42b, 42c and 42d in Fig. 1. Secured to and rotatable with each axle is a sleeve 41 having projecting radially therefrom a casing member 40. Both the sleeve 41 and casing member 40 are preferably made of some electrically insulating material, such for example as micarta, Bakelite, or hard rubber.

Within the casing member 40 are disposed two stationary contacts 45 and a movable contact 46 in the form of a ball or spherical element. The stationary contacts 45 and the ball 46 are so arranged that when the associated axle is stationary, a spring 47 will urge the ball 46 inwardly, in a radial direction, so as to disengage it from the two stationary contacts. When, however, the associated axle is rotating above a predetermined low speed, as for example from three to five miles per hour, the centrifugal force acting on the ball 46 will overcome the opposing force exerted by the spring 47 and cause the ball to engage the two stationary contacts 45.

One of the stationary contacts 45 is connected by conductor 49 (see Fig. 5) to a slip ring 48 rigidly disposed on the insulating sleeve member 41. A brush 50 engages the slip ring 48 for providing external electrical connection therewith. Similarly, the other of the two contacts 45 is connected by conductor 52 to slip ring 51, which is engaged by brush member 53. It will be thus observed that the contacts 45 and ball 46 provide a centrifugally operated switch device which may be connected in a circuit by means of the brushes 50 and 53.

Each of the vehicle axles will, of course, be provided with a pair of load bearing wheels 43, each of which will roll upon the usual rail 44. It follows from what has been said, therefore, that when the pair of wheels 43 associated with any one axle are rotating above a predetermined low speed, the ball contact 46 will be in engagement with the stationary contacts 45, but when such pair of wheels diminishes in speed below this predetermined value the ball contact 46 will disengage from the two stationary contacts 45.

Further understanding of the invention will be best understood by describing the operation of the embodiment disclosed.

*Operation*

In describing the operation of the invention, it will be assumed that the vehicle on which the invention has been installed is operating at some speed above the aforesaid predetermined low speed. Under this condition, the ball contact 46 in each centrifugal switch device 18 will be in engagement with the two stationary contacts 45.

Now if the vehicle is provided with a trolley 55 engaging a trolley wire 56, over which electric energy is supplied, two circuits may be traced from the trolley to the magnet valve device 15 as follows. Beginning at trolley 55, one circuit includes a current limiting resistance 57, conductor 58, retardation controller contacts 36, 30 and 35, conductor 59, indicating device 60 (which will be referred to more fully subsequently) and conductor 61. Assuming a grounded power system, the return circuit from the magnet valve device 15 may be by way of ground connection 62.

Now with the vehicle operating at the speed assumed, the second circuit from the trolley comprises resistance 63, conductor 64, each of the centrifugally operated switch devices 18 associated with each of the axles 42a, 42b, 42c and 42d (which are connected in series as clearly shown in Fig. 1), conductor 65, retardation controller contacts 36, 30 and 35, and from thence by way of the same elements previously described. It will be observed that between the trolley 55 and the retardation controller device there are two independent circuits arranged in parallel, one including the resistance 57 and the conductor 58, and the other including the resistance 63 (which is of the same ohmic resistance value as resistance 57) and the series arrangement of the four centrifugally operated switch devices 18.

With a circuit completed from the source of electrical energy to the magnet valve device 15, as described, electromagnet 24 will be energized and the supply and release valves 21 and 22 will be positioned as illustrated.

If now it is desired to effect an application of the brakes, the handle 20 of the brake valve device 11 is moved to application position and left there until fluid under pressure has been established in the brake cylinder 10 to the desired degree. Brake valve handle 20 is then turned to lap position.

As before mentioned, an indicating device 60 is disposed in the circuit to the magnet valve device 15. When the electromagnet 24 of this valve device is energized, current will also flow through the indicating device 60. This device will then indicate that the electromagnet 24 is energized and that the communication to the brake cylinder is open.

Now as the brakes are applied and the vehicle begins to decelerate, the resulting force of inertia will act upon the pendulum 27 to cause it to move to the left. Assuming that the rate of retardation is equivalent to or greater than the aforesaid lower limiting rate of retardation, the pendulum will assume a position somewhat as shown in Fig. 2. For this position of the pendulum, the weight 30 having disengaged from the stationary contact 36 the circuit between the trolley 55 and the magnet valve device 15 which included the resistance 57 and the conductor 58 will be opened. But the circuit which includes the resistance 63 and the series arrangement of the centrifugally operated switch devices 18 is maintained, because the retardation controller contact 30 is still in engagement with the contact 35. It will be apparent, therefore, that the magnet valve device 15 is now under the joint control of the four centrifugally operated switch devices 18 and the retardation controller device 17.

Let it be now assumed that the braking force is such that one pair of wheels 43 associated with one of the axles begins to slide. When a wheel begins to slide, it reduces in speed from that corresponding to vehicle speed through a diminishing speed range to the locked wheel state. As the wheel thus decreases in speed it is said to be slipping, and it is said to slide only after it reaches the locked wheel state. Now as the slipping continues and the wheel diminishes in speed below the aforesaid predetermined low speed (three or four miles per hour) the ball contact 46 on that axle will disengage from the stationary contacts 45.

Since all of the centrifugally operated switch devices 18 are arranged in series, it follows that the circuit to the electromagnet 24 of the magnet valve device 15 will be interrupted when any one set of contacts open. As a consequence, the spring 23 of the magnet valve device will shift the two valves 21 and 22 to their upper positions, closing communication between pipes 14 and 16, and opening pipe 16, and consequently brake cylinder 10, to the atmosphere by way of the exhaust port containing the restriction 25. Fluid under pressure will be then released from the brake cylinder 10 at a rate dependent upon the size of the choke 25.

When the brake cylinder pressure has been reduced sufficiently the sliding wheel or wheels will commence to rotate again and will eventually attain a speed corresponding to vehicle speed.

When the circuit to the magnet valve device was interrupted, as described, the indicating device 60, which is preferably located in the operator's cab or booth, gave such an indication, so that the operator knew that a wheel sliding condition existed.

Now as the sliding wheel commences to rotate again, and attains a speed above the aforementioned predetermined low speed, the ball contact 46 associated therewith will engage the stationary contacts 45 and again complete the circuit to the magnet valve device 15. This terminates the venting of the brake cylinder and opens communication between pipes 14 and 16. The operator may then by proper manipulation of the brake valve handle 20 control the reapplication of the brakes so as to minimize the danger of a recurrence of the wheel sliding condition.

When the brakes were released as a result of a sliding wheel or wheels, the rate of retardation of the vehicle diminished. But even though the rate diminished sufficiently for retardation controller contacts 30 and 36 to reengage, magnet valve device 15 cannot be reenergized until the wheel sliding condition has been corrected and switch contacts 45 and 46 reengage. The brakes cannot then be reapplied until the wheel sliding condition has been corrected.

It will be observed from the foregoing that the centrifugally operated switch devices 18 are only effective in the event that a rate of retardation equal to or greater than the aforesaid lower limiting rate of retardation is attained. Now in the event that good rail conditions exist, and no wheel sliding occurs, the degree of application of the brakes may be greatly increased so that the rate of retardation will rise considerably above the lower limiting rate. The retardation controller pendulum 27 will then swing further to the left, and when its position corresponds to a rate above the aforesaid upper limiting rate of retardation, it assumes a position as shown in Fig. 3. In this position, since the weight 30 is disengaged from the contact 35, the circuit to the magnet valve device 15 will be interrupted, just the same as when interrupted by operation of one of the centrifugally operated switch devices 18. The brake cylinder pressure will be reduced in the manner before described, and the indicating device 60 will likewise indicate to the operator that the excessive rate has been attained.

As the brake cylinder pressure is reduced by operation of the magnet valve device 15, the rate of retardation correspondingly reduces. The pendulum 27 will then swing to the right and when its weight 30 has reengaged the contact 35 the magnet valve device 15 will be again energized to terminate the release. When the weight 30 reengages the contact 35 the indicating device 60 indicates to the operator that the rate of retardation has been reduced to or below the upper limiting rate. The operator may then manipulate the brake valve handle 20 as his judgment dictates.

From the foregoing description it will be apparent that the centrifugally operated switch devices are effective for any rate of retardation between the said lower limiting rate and the said upper limiting rate, but that when the upper limiting rate is reached or exceeded the retardation controller device deenergizes the magnet valve device 15 and may thus alone be effective in controlling brake cylinder pressure.

While I have described my invention in connection with one specific embodiment, it is to be understood that I am not to be limited alone to this embodiment, nor otherwise than by the spirit and scope of the appended claims.

Having now described my invention, what I claim as new and desire to secure by Letters Patent, is:

1. In a vehicle brake system, in combination, means for effecting an application of the brakes, means operative in response to a wheel sliding condition for effecting a continuous release of the brakes at a predetermined rate of release, inertia operated means operative over a chosen range of rates of retardation of the vehicle for rendering said last mentioned means effective, and operative at a rate of retardation outside of said range for effecting a continuous release of the brakes at said predetermined rate of release independently of operation of said last means.

2. In a vehicle brake system, in combination, electroresponsive means operative to control the application and the release of the brakes, means including two parallel electric circuits leading to and being adapted to control the operation of said electroresponsive means, speed controlled means for controlling the opening and closing of one of said parallel circuits, and inertia operated means for controlling the opening and closing of both of said parallel circuits.

3. In a vehicle brake system, in combination, a brake cylinder, a magnet valve device operable to control the supply of fluid under pressure to and its release from said brake cylinder, control means including two parallel circuits leading to and being adapted to control the energization and deenergization of said magnet valve device, speed controlled switch means for controlling one of said parallel circuits, and inertia operated means for controlling both of said parallel circuits.

4. In a vehicle brake system, in combination, a brake cylinder, a magnet valve device operable to control the supply of fluid under pressure to and its release from said brake cylinder, control means including a circuit having two parallel branches for controlling the energization and deenergization of said magnet valve device, an inertia operated device for selecting which of said branches shall be alone effective in controlling the energization and deenergization of said magnet valve device, and speed controlled switch means for controlling one of said two branches.

5. In a vehicle brake system, in combination, means for effecting an application of the brakes, electroresponsive means operable when the energization thereof is varied to effect a release of the brakes, a centrifugally operated switch device operative during a wheel sliding condition to vary the energization of said electroresponsive means, and an inertia device operative to render said centrifugally operated switch device ineffective both below one and above another rate of deceleration of the vehicle.

6. In a vehicle brake system, in combination, means for effecting an application of the brakes, an electroresponsive valve device operative when the energization thereof is varied to effect a release of the brakes, a switch device operative during a wheel sliding condition for varying the energization of said electroresponsive valve device, means for shunting said switch device to render it ineffective, and an inertia device operative to remove said shunting in response to a predetermined rate of retardation of the vehicle.

7. In a vehicle brake system, in combination, a brake cylinder, a magnet valve device operable to control the supply of fluid under pressure to and its release from said brake cylinder, a plurality of vehicle axles, a plurality of centrifugally operated switch devices each of which is associated with one of said axles, means for connecting said switch devices in a series group, shunting means for shunting said series group, and a retardation controller device operative at a predetermined rate of retardation to render said shunting means ineffective and to place said magnet valve device under the control of said series group of switch devices.

8. In a vehicle brake system, in combination, means for effecting an application of the brakes, means operated in response to a wheel sliding condition for effecting a release of the brakes, and inertia operated means operative at a predetermined rate of retardation of the vehicle for rendering said last means effective to effect a release of the brakes, and operative at a higher rate of retardation to render said last means ineffective to effect a release of the brakes.

9. In a vehicle brake system, in combination, a brake cylinder; a magnet valve device operable to control brake cylinder pressure; an indicating device; a source of current supply; means providing for the formation of a series electric circuit including said magnet valve device, said indicating device and said source of current supply; wheel sliding control means; inertia operated means; and means electrically connecting said wheel sliding control means and said inertia operated means to said series circuit whereby to place said circuit jointly under the control of said two means.

GEORGE L. COTTER.